April 11, 1933.  C. W. CURLE  1,903,528
COMBINED SLUG GAUGE AND THICKNESS TRIMMER
Filed May 26, 1930   2 Sheets-Sheet 1
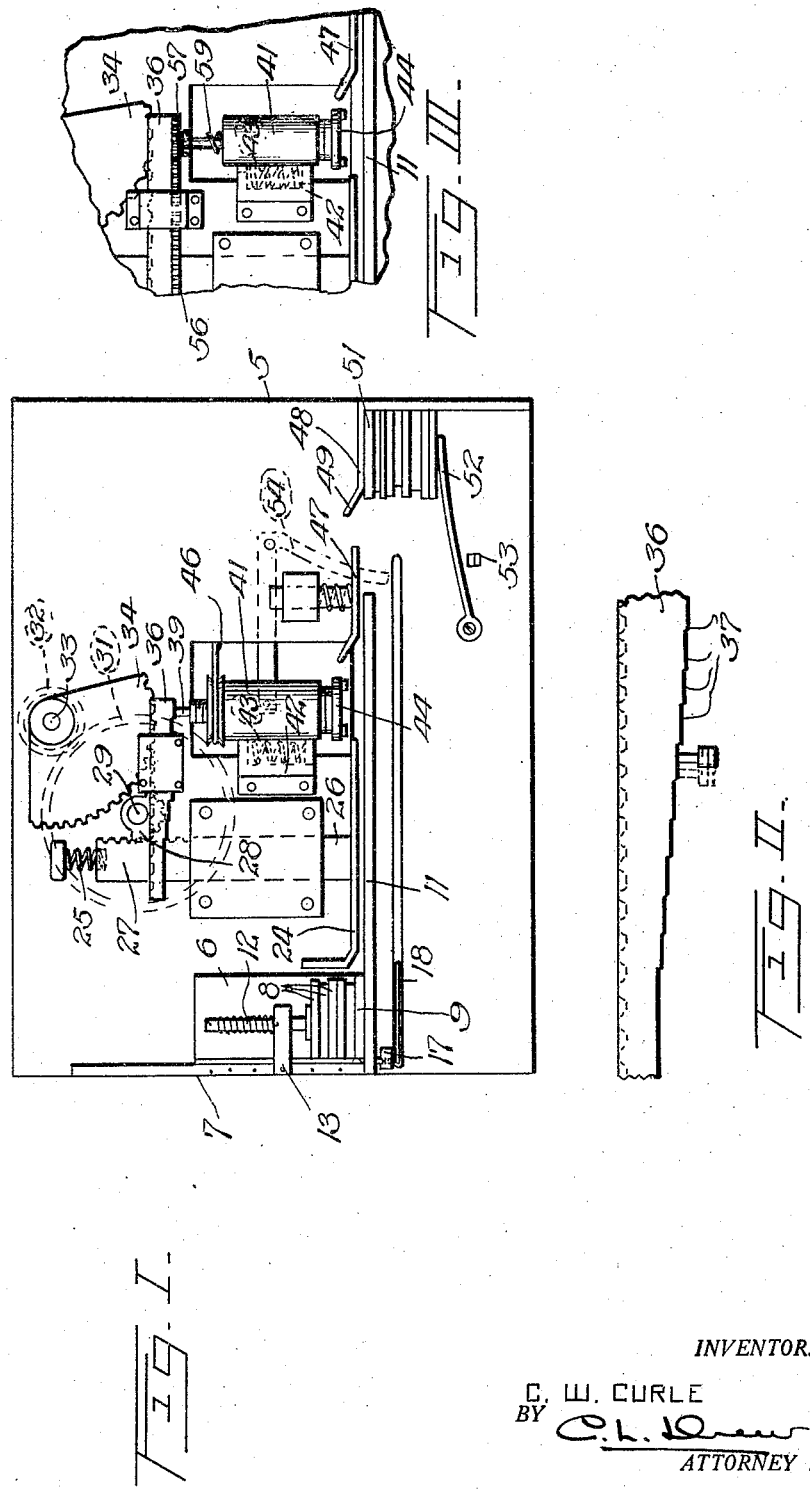
INVENTOR.
C. W. CURLE April 11, 1933.  C. W. CURLE  1,903,528
COMBINED SLUG GAUGE AND THICKNESS TRIMMER
Filed May 26, 1930   2 Sheets-Sheet 2
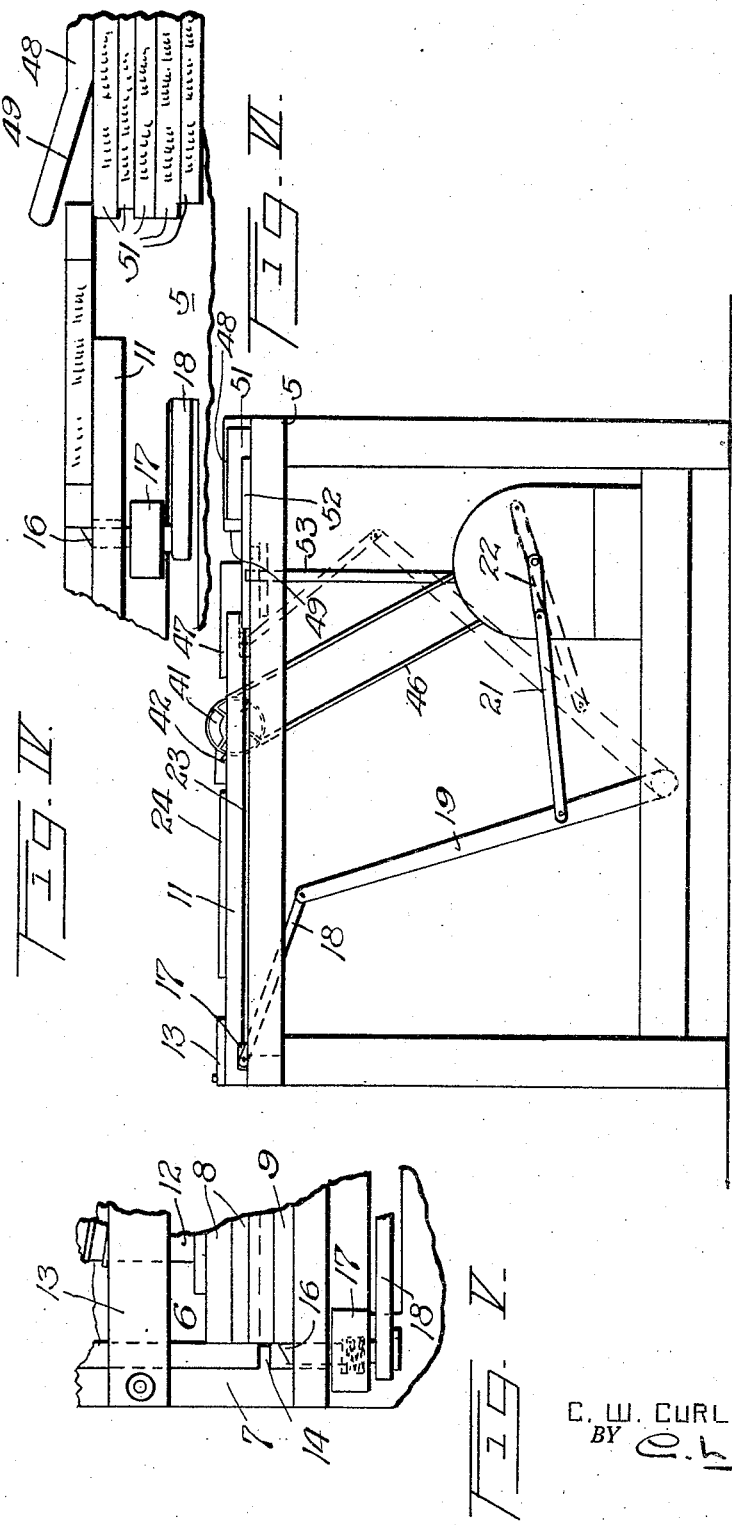
INVENTOR.
C. W. CURLE
BY
ATTORNEY Patented Apr. 11, 1933

1,903,528

UNITED STATES PATENT OFFICE

CHARLES W. CURLE, OF SAN FRANCISCO, CALIFORNIA

COMBINED SLUG GAUGE AND THICKNESS TRIMMER

Application filed May 26, 1930. Serial No. 455,664.

This invention relates to improvements in slug thickness trimming devices.

The principal object of this invention is to produce a machine which will automatically trim linotype slugs to standard thicknesses.

Another object is to produce a machine which will operate on slugs of various standard thicknesses.

A further object is to produce a machine wherein the trimming operation is automatic.

A further object is to produce a machine of this character which is simple in construction, sturdy in operation, and therefore one in which the parts will not become easily deranged.

A still further object is to provide means whereby the slugs will be re-stacked in the same order in which they enter the machine.

Other objects and advantages will be apparent during the course of the following description.

In the accompanying drawings forming a part of this specification, and in which like numerals designate like parts throughout the same, Figure I is a top plan view of my machine.

Figure II is a fragmentary detail view of the gauge.

Figure III is a modified form of cutter adjustment.

Figure IV is a front elevation of the machine.

Figure V is an enlarged fragmentary detail view of the feed mechanism, and

Figure VI is an enlarged fragmentary view showing the manner in which the slug is finally stacked.

The slugs cast by a type casting machine vary in thickness so that the molds of the casting machine become warped and therefore do not cast the exact size of slug for which the mold is designed. It usually happens therefore that the slugs will be from .001 to several thousandths of an inch oversize.

There are twenty-one different standard thicknesses of slugs which vary .014 of an inch between each standard thickness. Therefore, the machine must be able to handle any one of these twenty-one different standard thicknesses of slugs, which we will assume are all originally cast over-size, and to pass them through the machine successively, and to cut from each one only that amount which it is over-size above its standard.

In order to accomplish this, the slug is first moved against a movable guide and between a stationary guide. The result is that the movable guide is forced away from the stationary guide a distance equal to the thickness of the slug being passed there-between.

This movement of the movable guide is multiplied through suitable gearing, so that a stepped gauge-plate is moved either to the right or to the left, and comes to rest with one of its steps in alignment with a stop carried upon a cutter, this stop on the cutter contacting the step surface to position the cutter so that it will only remove from the slug the amount of the additional thickness of the slug above its standard.

For example, if the slug passing through the machine is an eight-point, and it is .002 of an inch over size, this arrangement just described will set the cutter so that only the .002 of an inch above the eight-point will be taken off of the slug as it passes the cutter.

Now, assuming that a fourteen-point slug is passing through the machine, the same action will again take place, with the exception that the stop on the cutter will come to rest upon the step of the thickness gauge which corresponds to the fourteen-point, and as a result, only that excess metal above the standard fourteen point thickness will be cut off.

This action is true for all of the various thicknesses of slugs, i. e., that the machine automatically adjusts the cutting element to accommodate for the slug being treated.

In the accompanying drawings wherein for the purpose of illustration is shown a preferred embodiment of my invention, the numeral 5 designates a table, or other like support, upon which a galley 6 may rest, the rail of the galley engaging a side-bar 7 of the table.

This galley contains a plurality of slugs 8, which are to be passed through the machine. The first slug in the galley to be treated is designated by the numeral 9 and contacts a stationary guide 11. The balance of the slugs are advanced against this guide 11 in succession as the slugs are removed from the galley by a spring pressed plunger 12 mounted upon an arm 13.

By referring to Figure V, it will be noted that the rail of the galley 6 engages a stop 14 formed upon the rail 7. This results in the slug 9 being pushed off of the galley by the spring-pressed plunger 12, and it is then in alignment with a spring-pressed dog 16 carried in a block 17, which slides upon the table top 5. This block is reciprocated by a pivoted link 18 pivoted to a rocker arm 19, which in turn is actuated by a link 21 and a crank 22. This crank 22 is rotated in any desired manner.

The dog 16 travels in a slot 23 formed between the table top 5 and the stationary guide 11.

Opposed to the stationary guide 11 is a movable guide 24 carried upon a slider 26 movably supported upon the table 5. This slider is normally held in advance position by a spring 25 and has a rack 27 which engages a gear 28. This gear 28 is mounted upon a shaft 29 which passes through the table 5 and has a large gear 31 secured thereto. This large gear 31 in turn meshes with a small gear 32 carried upon the shaft 33 which also passes through the table 5.

A segmentary gear 34 is secured to the shaft 33 and meshes with teeth formed in the back of the thickness gauge 36. This thickness gauge is provided with a series of steps 37 (see Figure II), and is slidable in a bracket 38. This gauge is so positioned that the steps 37 are in alignment with a stop 39 carried upon a slidable cutter head 41. This cutter head is supported by a bracket 42 and is slidable therein and normally held by a spring 43 so that the stop 39 will bear firmly against the step 37 which it is contacting.

This cutter head 41 carries a cutter 44, which is rotated through the medium of a belt 46 passing over the pulley connected to the spindle of the cutter. An intermediate guide 47 receives the advancing end of the slug after it passes the cutter 44, and serves to direct the same toward the receiving arm 48. This receiving arm has a cam surface 49 which causes the slug to advance the previously received slugs 51 against a spring arm 52, which spring arm is adapted to engage a stop 53, which stop extends through the table 5, and serves to shut off power when the receiving end has been filled with slugs.

The operation of my machine is, as follows:

Assuming that a galley of slugs has been placed on the table top 5 and the arm 13 has been adjusted so as to bring the spring-pressed plunger 12 into engagement with the slugs, the first slug in the galley will engage the stationary guide 11, and due to the fact that the galley rail is engaged by the stop 14, the first slug 9 will be pushed off of the galley on to the table top and in alignment with the spring-pressed dog 16.

Assuming now that the motor or power has been started, the result will be that the crank 22 and link 21 will move the rocker arm 19 and link 18. This will cause the dog 16 to move toward the right of the drawing, thus moving the slug 9 between the stationary guide 11 and a movable guide 24.

This action will cause the guide 24 to move against the compression of the spring 25, which movement will be transmitted and multiplied through the gears 28, 31 and 32 to the segment 34 and to the sliding thickness gauge 36. At the beginning of the actuation of the machine the slide 36 will be at the position shown in Figure I; consequently, as it is moved toward the right of the drawing, the stop 39 may move upward until the proper setting has been reached. By the time that this has occurred the cutter 44 will be in position to trim off of the advancing slug any excess metal above the gauge for which it has been set, and the slug will pass then to the intermediate guide 47, which will lead the same into engagement with the receiver 48, where it will be stacked in the same order in which it left the original stacking in the galley. When the rocker arm 19 and link 18 has reached its extreme movement toward the right the link 18 will engage a bell crank lever 54 pivoted beneath the table top, which bell crank lever will move the cutter head 41 against the tension of the spring 43, and as soon as this occurs the spring 25 will function to return all of the parts of the gauging mechanism back to their normal position of rest.

As soon as the link starts back so that the dog will pick up the next succeeding slug, the cutting head is released by the bell crank 54, so that the stop 39 will again contact the thickness gauge 36.

In the modified form shown in Figure III, the parts are identical with those previously described and bear the same numerals, the only difference being that the gauge-piece 36 carries a rack 56 which meshes with a gear 57 mounted upon a shaft 58, which has a worm 59. This worm has threaded engagement with the cutter-head 41. The result of this construction is that when the gauge-piece 36 is moved as previously described, rotation will be imparted through the gear 57 to the shaft 58, and worm 59, and consequently the worm will move the cutter-head 41 against the tension of the spring 43, the amount of movement being governed by the pitch of the worm and the amount of rotation of the same.

It will be noted that the slug in passing through the machine is trimmed from end to end, and as a consequence a much more accurate trimming is accomplished than is possible where the slug is pushed through between a pair of cutters operating from top to bottom as is done in the original trimming when the slug leaves the casting machine.

It will thus be seen that I have produced a machine which will accomplish all of the objects above set forth.

It is to be understood that the forms of my invention herewith shown and described are to be taken as preferred examples of the same and that various changes relative to the shape, size, material and arrangement of parts may be resorted to without departing from the spirit of the invention, or the scope of the subjoined claims.

Having thus described my invention, I claim:—

1. In a slug trimming device, a support, a stationary guide positioned on said support, a movable guide positioned on said support and arranged parallel to said first mentioned guide, means for moving a slug between said guides, a slider secured to said movable guide, said slider having teeth formed thereon, a stepped gauge movably mounted on said support, teeth formed on said gauge, gearing interposed between the teeth on said slider and the teeth on said gauge, a cutter mounted on said support, a stop carried by said cutter, said stop being in alignment with one of the steps of said gauge, and means for retaining said stop in engagement with its step while said cutter is being actuated.

2. In a slug trimming device, a support, a stationary guide positioned on said support, a movable guide positioned on said support and arranged parallel to said first mentioned guide, means for moving a slug between said guides, a slider secured to said movable guide, said slider having teeth formed thereon, a stepped gauge movably mounted on said support, teeth formed on said gauge, gearing interposed between the teeth on said slider and the teeth on said gauge, a cutter mounted on said support, a stop carried by said cutter, said stop being in alignment with one of the steps of said gauge, means for retaining said stop in engagement with its step while said cutter is being actuated, a bell crank lever secured to said support and having one end adapted to move said cutter away from said gauge for the purpose of permitting the gauging mechanism to return to its initial position for subsequent gauging operation.

CHARLES W. CURLE.